(12) United States Patent
Oguma et al.

(10) Patent No.: US 12,120,619 B2
(45) Date of Patent: Oct. 15, 2024

(54) TERMINAL AND COMMUNICATION METHOD

(71) Applicant: NTT DOCOMO, INC., Tokyo (JP)

(72) Inventors: Yuta Oguma, Tokyo (JP); Hiromasa Umeda, Tokyo (JP); Hisashi Matsuoka, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 366 days.

(21) Appl. No.: 17/634,867

(22) PCT Filed: Aug. 15, 2019

(86) PCT No.: PCT/JP2019/032085
§ 371 (c)(1),
(2) Date: Feb. 11, 2022

(87) PCT Pub. No.: WO2021/029084
PCT Pub. Date: Feb. 18, 2021

(65) Prior Publication Data
US 2022/0330177 A1    Oct. 13, 2022

(51) Int. Cl.
*H04W 52/36* (2009.01)
*H04B 17/10* (2015.01)
(Continued)

(52) U.S. Cl.
CPC ........ *H04W 52/367* (2013.01); *H04B 17/102* (2015.01); *H04W 8/24* (2013.01); *H04W 52/265* (2013.01); *H04W 52/42* (2013.01)

(58) Field of Classification Search
CPC ................. H04W 52/367; H04W 8/24; H04W 52/265; H04W 52/42; H04W 72/04; H04W 16/28;
(Continued)

(56) References Cited

U.S. PATENT DOCUMENTS

| 2006/0199604 A1 | 9/2006 | Walton et al. |
| 2018/0279403 A1* | 9/2018 | Kim ...................... H04W 72/21 |

(Continued)

FOREIGN PATENT DOCUMENTS

WO    WO-2022149942 A1 *  7/2022    .............. H04W 8/22

OTHER PUBLICATIONS

Office Action in the counterpart Chinese Application No. 201980099322.7, mailed May 30, 2023 (7 pages).
(Continued)

*Primary Examiner* — Lana N Le
(74) *Attorney, Agent, or Firm* — Osha Bergman Watanabe & Burton LLP

(57) ABSTRACT

A terminal includes: a control section that generates Capability information including UE Capability for a Power Class; and a transmission section that transmits the Capability information. The Power Class is specified by four items of Max Total Radiated Power (TRP), Max peak Equivalent Isotropic Radiated Power (EIRP), Min peak EIRP, and Spherical coverage EIRP, and an Inter-band-Carrier-Aggregation (CA) specified value of at least one of the Max peak EIRP and the Min peak EIRP for Inter-band CA in which a plurality of bands are used is defined by a method different from a method for a non-Inter-band-CA specified value.

4 Claims, 5 Drawing Sheets

(51) Int. Cl.
*H04W 8/24* (2009.01)
*H04W 52/26* (2009.01)
*H04W 52/42* (2009.01)

(58) Field of Classification Search
CPC ..... H04W 8/22; H04W 52/146; H04W 72/21; H04W 52/34; H04W 72/046; H04W 52/38; H04W 88/06; H04W 52/30; H04W 52/36; H04W 88/02; H04W 72/51; H04W 72/0473; H04W 52/383; H04W 52/26; H04B 17/102; H04B 17/10; Y02D 30/70
See application file for complete search history.

(56) References Cited

U.S. PATENT DOCUMENTS

| | | | |
|---|---|---|---|
| 2019/0081670 A1* | 3/2019 | Liu | H04B 7/043 |
| 2021/0022083 A1* | 1/2021 | Takahashi | H04W 52/42 |
| 2022/0109515 A1* | 4/2022 | Chervyakov | H04W 88/02 |
| 2022/0330039 A1* | 10/2022 | Wang | H04W 8/24 |
| 2023/0223980 A1* | 7/2023 | Yang | H04B 17/102 455/78 |

OTHER PUBLICATIONS

Office Action in the counterpart Japanese Application No. 2021-539808, mailed May 9, 2023 (4 pages).
Extended European Search Report issued in European Application No. 19941735.3, mailed on Jul. 11, 2023 (8 pages).
NTT Docomo, Inc.: "Common understanding to multiband relaxation", 3GPP TSG-RAN WG5 Meeting #4-5G-NR Adhoc, R5-190121, Singapore, Singapore, Jan. 21-25, 2019 (5 pages).
Office Action issued in Indian Application No. 202217011583; Dated Dec. 28, 2023 (8 pages).
International Search Report issued in PCT/JP2019/032085 on Mar. 24, 2020 (5 pages).
Written Opinion of the International Searching Authority issued in PCT/JP2019/032085 on Mar. 24, 2020 (3 pages).
3GPP TS 38.101-2 V16.0.0; "3rd Generation Partnership Project; Technical Specification Group Radio Access Network; NR; User Equipment (UE) radio transmission and reception; Part 2: Range 2 Standalone (Release 16)"; Jun. 2019 (154 pages).
Office Action issued in the counterpart Chinese Application No. 201980099322.7, mailed Nov. 25, 2023 (8 pages).
Office Action issued in the counterpart Japanese Application No. 2021-539808, mailed Oct. 17, 2023 (7 pages).
Office Action issued in Israeli Application No. 290594; Dated Mar. 11, 2024 (4 pages).

* cited by examiner n257, n258, n261 (28GHz BAND)

| Power Class | Max TRP (dBm) | Max peak EIRP (dBm) | Min peak EIRP (dBm) | Spherical coverage EIRP (dBm, %-tile CDF) |
|---|---|---|---|---|
| 1 | 35 | 55 | 40 | (32, 85) |
| 2 | 23 | 43 | 29 | (18, 60) |
| 3 | 23 | 43 | 22.4 | (11.5, 50) |
| 4 | 23 | 43 | 34 | (25, 20) | n260 (38GHz BAND)

| Power Class | Max TRP (dBm) | Max peak EIRP (dBm) | Min peak EIRP (dBm) | Spherical coverage EIRP (dBm, %-tile CDF) |
|---|---|---|---|---|
| 1 | 35 | 55 | 40 | 32 |
| 2 | N/A | N/A | N/A | N/A |
| 3 | 23 | 43 | 20.6 | (8, 50) |
| 4 | 23 | 43 | 31 | (19, 20) |

FIG. 3

| Proposal | Summary | 28GHz | | | 38GHz | | | Sum of EIRP² (dBm) |
|---|---|---|---|---|---|---|---|---|
| | | TRP(dBm) | EIRP(dBm) | Spherical EIRP(dBm) | TRP(dBm) | EIRP(dBm) | Spherical EIRP(dBm) | |
| A | Same TRP between 28GHz and 38GHz | 20.0 | 19.4 | 8.5 | 20.0 | 17.6 | 5 | 21.6 |
| B | Same EIRP between 28GHz and 38GHz | 19.0 | 18.4 | 7.5 | 20.8 | 18.4 | 5.8 | 21.4 |
| C | EIRP greater at 38 GHz | 17.0 | 16.4 | 5.5 | 21.7 | 19.3 | 6.7 | 21.1 |

FIG. 4

For inter-band carrier aggregation, the UE shall support the minimum EIRP, the maximum EIRP, the maximum TRP, and the spherical EIRP for carrier aggregation, as specified in the following equation;

$$\Delta P_{powerclass, c} = P_{powerclass, c} - P_{powerclass, c\_CA}$$
$$\Delta TRP_{max, c} = TRP_{max, c} - TRP_{max, c\_CA}$$
$$\Delta P_{powerclass, c} = \Delta TRP_{max, c}$$
$$\sum trp_{max, c\_CA} = MIN\{trp_{max, c}\}$$

where

- $P_{powerclass, c}$ is the minimum EIRP as specified in sub-clause 6.2.1 for serving cell c (j=1...m);
- $TRP_{max, c}$ is the maximum TRP as specified in sub-clause 6.2.1 for serving cell c (j=1...m);
- $P_{powerclass, c\_CA}$ and $TRP_{max, c\_CA}$ are the minimum EIRP and maximum TRP that the UE shall meet for inter-band carrier aggregation, respectively;
- $\Delta P_{powerclass, c\_CA}$ and $\Delta TRP_{max, c\_CA}$ are the degradation between $P_{powerclass, c}$ and $P_{powerclass, c\_CA}$ and the degradation between $TRP_{max, c}$ and $TRP_{max, c\_CA}$, respectively;
- $trp_{max, c}$ is the liner value of $TRP_{max, c}$;
- $trp_{max, c\_CA}$ is the linear value of $TRP_{max, c\_CA}$ PROPOSAL A) : $TRP_{max, c\_CA}$ is specified as same $TRP_{max\_CA}$ for all serving cell
PROPOSAL B) : $P_{powerclass, c\_CA}$ is specified as same $P_{powerclass\_CA}$ for all serving cell
PROPOSAL C) : $P_{powerclass, c\_CA}$ is specified as $P_{powerclass, i\_CA} = P_{powerclass, k\_CA} + \Delta LB$ for serving cell i and k for (j=1...l...k...m), where $\Delta LB$ is the difference of propagation loss due to the difference of the carrier frequency for serving cells.

FIG. 5

TERMINAL AND COMMUNICATION METHOD

TECHNICAL FIELD

The present disclosure relates to a terminal and a communication method.

BACKGROUND ART

Future systems of Long Term Evolution (LTE) in a Universal Mobile Telecommunications System (UMTS) network have been studied (see Non-Patent Literature (hereinafter, referred to as "NPL") 1). Examples of the future systems of LTE include systems called LTE-Advanced (LTE-A), Future Radio Access (FRA), 5th generation mobile communication system (5G), 5G plus (5G+), New Radio Access Technology (New-RAT; NR), and the like.

3GPP specifies a maximum transmit power for each Power Class (hereinafter, also referred to as "PC" for short) for each of Sub6 (LTE/NR FR (Frequency Range) 1) of frequencies of 6 GHz or less including the 3.7 GHz band, the 4.5 GHz band, and the like and millimeter wave bands (NR FR2) such as the 28 GHz band, the 38 GHz band, and the like.

Each factory-default terminal is configured with the Power Class, and the terminal controls the transmit power so as to satisfy the specified transmit power of the Power Class when transmitting a radio signal. In addition, each of the terminals notifies a base station of information indicating UE Capability including the Power Class (hereinafter, referred to as "Capability information") at the start of communication.

3GPP specifies the Power Classes of from PC1 to PC4 for Sub6, and the Power Classes of from PC1 to PC4 for FR2. PC1 of FR2 is for fixed wireless communication, and PC2 of FR2 is for vehicle-mounted terminals.

An omnidirectional antenna having no directivity is used for Sub6, and each of the Power Classes is specified by Total Radiated Power (TRP). The TRP is the total value of power radiated into space.

In FR2, a directivity pattern is formed using an array antenna to perform power radiation (beamforming), and each of the Power Classes is specified by four items of Max TRP, Max peak Equivalent Isotropic Radiated Power (EIRP), Min peak EIRP, and Spherical coverage EIRP (see NPL 1). EIRP is a combined value of a transmit power and an antenna gain.

For example, in the case of PC3 of FR2 (28 GHz band), Max TRP is ≤23 dBm, Max peak EIRP is ≤43 dBm, Min peak EIRP is ≥22.4 dBm, and Spherical coverage EIRP is ≥(11.5 dBm, 50%-tile CDF) (see FIG. 3). A PC3 terminal controls the transmit power so as to satisfy all of these four items when transmitting a radio signal.

Spherical coverage EIRP is a specification for a spatial power (EIRP) distribution around a terminal, contributes to connectivity between the terminal and a base station, and is specified in terms of %-tile from the upper limit of Cumulative Distribution Function (CDF). For example, "Spherical coverage EIRP≥(25.0 dBm, 20%-tile CDF)" for PC4 means that EIPR is 25 dBm at a 20% point of CDF, i.e., EIRP is greater than 25 dBm at 80% of all measuring points in space.

CITATION LIST

Non-Patent Literature

NPL 1

3GPP TS 38.101-2 V16.0.0 (2019 Jul. 3)

SUMMARY OF INVENTION

Technical Problem

Conventionally, based on the assumption that radio waves are radiated simultaneously in the same direction in a case of contiguous Component Carriers (CCs) of the same band in Intra-band Carrier Aggregation (CA) in FR2, 3GPP has set, as specified values, the total power of Max TRPs for the CCs, the total power of Max peak EIRPs for the CCs, the total power of Min peak EIRPs for the CCs, and the total power of Spherical coverage EIRPs for the CCs.

However, when communication is performed using contiguous CCs of different bands in Inter-band CA in FR2, radio waves may be simultaneously radiated from the same or different antenna panels in multiple directions. Note that, even when the radio waves are radiated from one antenna panel in the same direction in mutually different bands, there is a possibility that the difference in bands causes a difference in beam directivity because of the frequency characteristics.

The spatial directivity needs to be taken into consideration of EIRP.

Accordingly, for Inter-band CA in FR2, it is desirable to newly define the specified value of Max peak EIRP and the specified value of Min peak EIRP (hereinafter, these specified values are referred to as "EIRP-related specified values") while considering the case where radio waves are simultaneously radiated in multiple directions.

One object of the present disclosure is to propose a method of defining the EIRP-related specified values for Inter-band CA in FR2 while considering the case where radio waves are simultaneously radiated in multiple directions.

Solution to Problem

A terminal according to one aspect of the present disclosure includes: a control section that generates Capability information including UE Capability for a Power Class; and a transmission section that transmits the Capability information, in which the Power Class is specified by four items of Max Total Radiated Power (TRP), Max peak Equivalent Isotropic Radiated Power (EIRP), Min peak EIRP, and Spherical coverage EIRP, and an Inter-band-Carrier-Aggregation (CA) specified value of at least one of the Max peak EIRP and the Min peak EIRP for Inter-band CA in which a plurality of bands are used is defined by a method different from a method for a non-Inter-band-CA specified value.

A communication method according to one aspect of the present disclosure includes steps performed by a terminal of: generating Capability information including UE Capability for a Power Class; and transmitting the Capability information, in which the Power Class is specified by four items of Max Total Radiated Power (TRP), Max peak Equivalent Isotropic Radiated Power (EIRP), Min peak EIRP, and Spherical coverage EIRP, and an Inter-band-Carrier-Aggregation (CA) specified value of at least one of the Max peak EIRP and the Min peak EIRP for Inter-band CA in which a plurality of bands are used is defined by a method different from a method for a non-Inter-band-CA specified value.

Advantageous Effects of Invention

According to the present disclosure, it is possible to define the EIRP-related specified values for Inter-band CA in FR2 while considering the case where radio waves are simultaneously radiated in multiple directions.

BRIEF DESCRIPTION OF DRAWINGS

FIG. 3 illustrates maximum transmit power specifications for each Power Class of FR2;

FIG. 4 illustrates numerical examples of proposals A to C in Variation 1 of one embodiment of the present disclosure;

FIG. 5 illustrates mathematical formulas expressing proposals A to C in Variation 1 of one embodiment of the present disclosure.

DESCRIPTION OF EMBODIMENT

The present disclosure has been made to solve the above problem. Hereinafter, one aspect of the present disclosure will be described with reference to the accompanying drawings.

[Configuration of Wireless Communication System]

Figure 1:
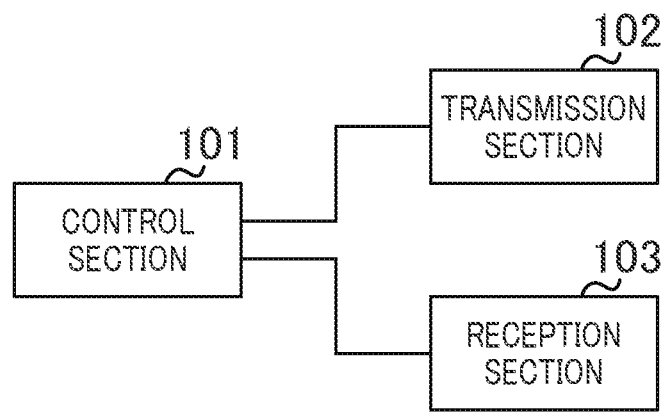
FIG. 1 is a block diagram illustrating an exemplary configuration of a base station.
Figure 2:
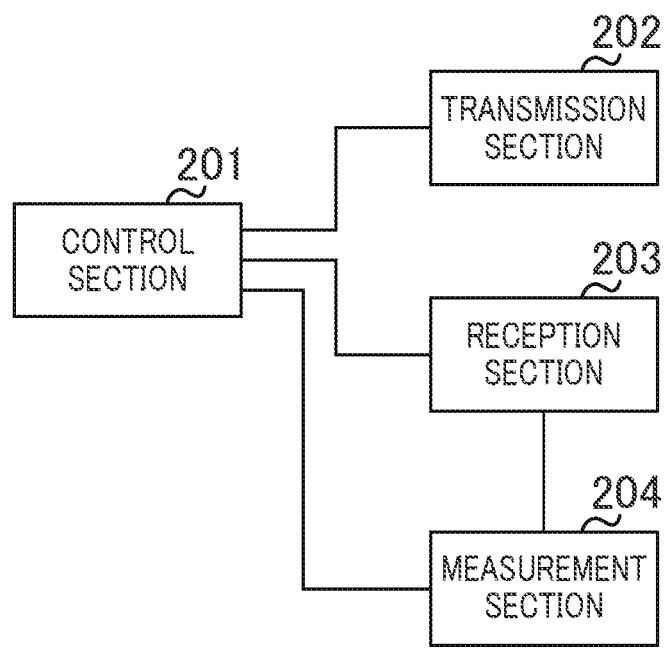
FIG. 2 is a block diagram illustrating an exemplary configuration of a terminal.

A wireless communication system according to the present embodiment includes base station 10 (see FIG. 1) and terminal 20 (see FIG. 2). Base station 10 transmits a DL signal to terminal 20. In addition, base station 10 receives a UL signal transmitted from terminal 20. Terminal 20 receives the DL signal transmitted from base station 10, and transmits the UL signal to base station 10.

[Configuration of Base Station 10]

FIG. 1 is a block diagram illustrating an exemplary configuration of base station 10 according to the present embodiment. Base station 10 includes control section 101, transmission section 102, and reception section 103, for example.

Control section 101 controls transmission processing of transmission section 102 and reception processing of reception section 103.

For example, control section 101 performs scheduling (e.g., resource allocation) for a DL data signal to be transmitted on a PDSCH and for a DL control signal to be transmitted on a PDCCH. Control section 101 performs scheduling also for a DL reference signal such as a synchronization signal (Primary Synchronization Signal (PSS)/Secondary Synchronization Signal (SSS)), CRS, CSI-RS, or the like.

Control section 101 performs scheduling also for a UL data signal to be transmitted on a PUSCH, a UL control signal to be transmitted on a PUCCH, a random access preamble to be transmitted on a PRACH, a UL reference signal, and the like.

In addition, control section 101 carries out connected-cell selection for terminal 20 or the like based on RRM report included in the UL signal and indicating a measurement result of reception quality.

Transmission section 102 transmits a signal (DL signal) for terminal 20 to terminal 20 under the control of control section 101.

Examples of the DL signal include DL data (also referred to as a PDSCH signal, for example), DL control information (also referred to as a PDCCH signal; the PDCCH includes Downlink Control Information (DCI), for example), a reference signal, and the like. Examples of the DL control information include: a RA message (also referred to as Random Access Response (RAR) or message 2, for example) including a Timing Advance (TA) command; information indicating a UL resource configuration (scheduling indication); Network Signaling (NS); and the like.

Terminal 20 may be notified of the DL control information through higher layer signaling, or through dynamic signaling of DCI or the like, for example. The higher layer signaling may also be referred to as Radio Resource Control (RRC) signaling or a higher layer parameter, for example.

Reception section 103 receives under the control of control section 101 a signal (UL signal) transmitted from terminal 20.

Examples of the UL signal include UL data (also referred to as a PUSCH signal, for example), UL control information (also referred to as a PUCCH signal, for example), a reference signal (SRS, for example), a RA signal, and the like. Examples of the UL control information include a RRM report and the like.

[Configuration of Terminal 20]

FIG. 2 is a block diagram illustrating an exemplary configuration of terminal 20 according to the present embodiment. Terminal 20 includes, for example, control section 201, transmission section 202, reception section 203, and measurement section 204.

Control section 201 controls transmission processing of transmission section 202 and reception processing of reception section 203.

For example, control section 201 may generate Capability information indicating the capability of terminal 20, and transmit the Capability information from transmission section 202 to base station 10. In addition, control section 201 may control the transmit power of the UL signal such that specified values of the Power Class of terminal 20 are satisfied. In addition, control section 201 may generate a RRM report based on a measurement result of measurement section 204, and transmit it from transmission section 202 to base station 10.

Transmission section 202 transmits the UL signal to base station 10 under the control of control section 201.

Reception section 203 receives under the control of control section 201 the DL signal transmitted from base station 10.

Measurement section 204 measures the reception quality of a signal received by reception section 203, and outputs the measurement result to control section 203. Values indicating the reception quality include received power (e.g., Reference Signal Received Power (RSRP)), received signal strength (e.g., Received Signal Strength Indicator (RSSI)), received quality (e.g., Reference Signal Received Quality (RSRQ)), and the like of the received signal.

[EIRP-Related Specified Value for Inter-Band CA]

Next, a description will be given of a method of defining EIRP-related specified values for Inter-band CA in FR2 (hereinafter, the values are referred to as "Inter-band-CA specified values").

FIG. 3 is a list of maximum transmit power specifications for each Power Class of FR2 described in NPL 1. As illustrated in FIG. 3, four Power Classes (PC1 to PC4) are specified for each of the 28 GHz band and the 38 GHz band of FR2 at present.

However, as described above, in Inter-band CA in FR2, the existing specified values are not based on the assumption that radio waves are simultaneously radiated in multiple directions.

Accordingly, the present inventors propose to newly introduce EIRP-related specified values for Inter-band CA in FR2 on the basis of the specifications of the existing Power Classes for FR2.

In the following, a description will be given of proposals of methods for defining a specified value of Max peak EIRP in relation to a case where Inter-band CA is performed using two bands of the 28 GHz band (first band) and the 38 GHz band (second band) by way of example.

<Proposal 1>

In proposal 1, a tester measures EIRP at 28 GHz at a measurement point in each beam direction, measures EIRP at 38 GHz at the measurement point in each of the beam directions, calculates the total power of the EIRP at 28 GHz and the EIRP at 38 GHz at the measurement point in each of the beam directions, and defines a maximum value of the total powers as the specified value. In other words, in proposal 1, beams at 28 GHz and beams at 38 GHz are set in the same directions, and the specified value is defined based on the total powers of EIRP in the respective directions.

According to the present proposal, it is possible to secure the total power limit for the beams in the same direction. It is thus possible to secure that maximum EIRP limits stipulated in the laws and regulations of respective countries are not exceeded, and it is also possible to secure a maximum EIRP limit as required in a particular area (e.g., hospital or the like). In addition, the present proposal has flexibility in EIRP distribution since only the total power value in each of the beam directions is defined. It is thus possible to intentionally adjust one beam to a high power depending on the distance to the base station as a connection target so as to enhance connectivity, for example.

<Proposal 2>

In proposal 2, a tester measures EIRP at 28 GHz at a measurement point in each beam direction, measures EIRP at 38 GHz at the measurement point in each of the beam directions, and defines the total power of the maximum value of EIRP at 28 GHz and the maximum value of EIRP at 38 GHz as the specified value. In other words, proposal 2 is to measure EIRP at 28 GHz and EIRP at 38 GHz at the measuring point in each of the beam directions, and define the specified value based on the total power of the maximum values of EIRP for the bands independently of whether the beam direction is the same or different between the bands.

According to the present proposal, the measurement is performed for each of 28 GHz and 38 GHz and is independent of whether the beam direction is the same or different between the bands, so that it is unnecessary to grasp the total values of EIRP in the respective same directions. Accordingly, the terminal mounting can be simplified and reduction in development costs can be expected. Moreover, the specified value is defined based on the total power but independently of whether the beam direction is the same or different between the bands, so that it is possible to secure the total power limit for the beams as in the case of proposal 1.

<Proposal 3>

In proposal 3, a tester measures EIRP at 28 GHz at a measurement point in each beam direction, measures EIRP at 38 GHz at the measurement point in each of the beam directions, and defines the maximum value of EIRP at 28 GHz and the maximum value of EIRP at 38 GHz as independent specified values, respectively. In other words, proposal 3 is to measure the EIRP at 28 GHz and the EIRP at 38 GHz at the measuring point in each of the beam directions, and define the specified values based on the maximum value of EIRP for each of the bands independently of whether the beam direction is the same or different between the bands.

According to the present proposal, the determination is independent of whether the beam direction is the same or different between the bands and is based on the maximum value of EIRP for each of the bands, and therefore, the terminal can perform RF control independently for each of the bands with respect to EIRP control, so that the terminal mounting can be more simplified than in proposal 2, and reduction in development costs can be expected. Moreover, not the total power but the independent EIRPs are specified, so that it is possible to secure also a minimum EIRP distribution desirable to be secured.

<Proposal 4>

In proposal 4, a tester measures EIRP at 28 GHz at a measurement point in each beam direction, measures EIRP at 38 GHz at the measurement point in each of the beam directions, further calculates the total power of the EIRP at 28 GHz and the EIRP at 38 GHz at the measurement point in each of the beam directions, defines the maximum value of the total powers as the specified value, and further defines as the specified values also the EIRP at 28 GHz and the EIRP at 38 GHz in the beam direction in which the total power is the greatest. In other words, in proposal 4, beams at 28 GHz and beams at 38 GHz are set in the same directions, and the specified values are defined based on the total powers of EIRP in the respective directions and based on individual EIRPs for the respective bands in the beam direction in which the total power is the greatest.

According to the present proposal, it is possible to secure the total power limit for the beams as in the case of proposal 1. Moreover, the independent EIRPs are specified as in the case of proposal 3, so that it is possible to secure also a minimum EIRP distribution desirable to be secured.

Note that, in a test in which a plurality of beams are radiated, transmissions may be performed in a time-division manner in bands of Inter-band CA for EIRP measurement. For example, a Time Division Duplex (TDD) system is used in FR2 bands, and accordingly, a UL Configuration of TDD Configurations may be used for the EIRP measurement while divided between the bands. In particular, the above test method is effective since millimeter-wave communication is tested in the Over The Air (OTA) test environment and there is a possibility that it is difficult to measure a plurality of beams radiated from terminals at the same time due to the effects of interfering waves, noise, and the like in the environment in which a plurality of frequencies coexist. The OTA test environment is a measurement system in which a radio wave is radiated into the real space to perform a test, unlike a Conducted (wired) test environment that has been carried out for a Sub6 RF test in which an RF port of a terminal is connected to a measuring instrument by a wire to perform a test.

Meanwhile, Peak EIRP represents the greatest value of EIRP in the periphery of the terminal. Min Peak EIRP and Max Peak EIRP represent the minimum value and the maximum value of Peak EIRP, respectively, that is, the range regarded as Peak EIRP as follows:

$$\text{Min peak EIRP} \leq \text{Peak EIRP} \leq \text{Max peak EIRP.}$$

Since proposals 1 to 4 described above are the methods for specifying Peak EIRP, it is also confirmed for Min peak EIRP that Peak EIRP is equal to or greater than Min Peak EIRP, after Peak EIRP being the greatest EIRP is measured.

[Effect]

As described above, according to the present embodiment, it is possible to define the EIRP-related specified values for Inter-band CA in FR2 while considering the case where radio waves are simultaneously radiated in multiple directions.

[Variations]

The following variations are proposed on methods of defining specified values of Min peak EIRP in the case where the specified values of EIRP of the respective bands are defined as in above-described proposal 3 or 4.

<Variation 1>

Variation 1 is a method of defining a specified value of Min peak EIRP in a case where the total value of Max TRP at the time of CA is set to the same value as at the time of Single carrier transmission. For example, the Max TRP at the time of CA of the CC of PC3 and the CC of PC3 is 23 dBm (see FIG. 3).

<Proposal A>

Min EIRP on the assumption that TRP is the same between the 28 GHz band and the 38 GHz band is specified. Spherical coverage EIRP is also specified accordingly.

<Proposal B>

The same Min EIRP is specified between the 28 GHz band and the 38 GHz band. Spherical coverage EIRP is also specified accordingly. The same Min EIRP can enhance the connectivity in CA.

<Proposal C>

Min EIRP is specified such that Min EIRP for the 38 GHz band is higher than Min EIRP for the 28 GHz band. Spherical coverage EIRP is also specified accordingly. The higher Min EIRP for the 38 GHz band can enhance the connectivity in CA since the propagation loss in the 38 GHz band is larger than the propagation loss in the 28 GHz band (there is a difference of about 2.6 dB in the case of the same distance).

Note that, the specified values may also be defined similarly on the basis of spherical coverage EIRP instead of Min EIRP in proposals B and C.

FIG. 4 illustrates numerical examples of proposals A to C in Variation 1.

FIG. 5 illustrates mathematical formulas expressing proposals A to C in Variation 1.

<Variation 2>

Variation 2 is a method of defining a specified value of Min peak EIRP in a case where the total value of Max TRP at the time of CA is set to the total value of Max TRPs for respective bands at the time of Single carrier transmission. For example, Max TRP at the time of CA of the CC of PC3 and the CC of PC3 is 26 dBm. At this time, the EIRP distributions for the bands are set respectively to specified values for the Single carrier transmission. For example, in the case of CA of the 28 GHz band and the 38 GHz band, 22.4 dBm and 20.6 dBm are set as the specified values of Min peak EIRP for the 28 GHz band and the 38 GHz band, respectively.

Note that the above-described proposals may also be applied to specifications for a terminal that performs Multi beam radiation in the case of Single carrier transmission.

The above-described proposals may also be applied to specifications of Peak EIS and/or Spherical EIS in Inter-band DL CA.

The above-described proposals may also be applied to Inter-band CA in the same frequency band (e.g., 28 GHz+28 GHz, or 38 GHz+38 GHz).

The embodiments of the present disclosure have been described above.

(Hardware Configuration)

Note that, the block diagrams used to describe the above embodiment illustrate blocks on the basis of functions. These functional blocks (component sections) are implemented by any combination of at least hardware or software. A method for implementing the functional blocks is not particularly limited. That is, the functional blocks may be implemented using one physically or logically coupled apparatus. Two or more physically or logically separate apparatuses may be directly or indirectly connected (for example, via wires or wirelessly), and the plurality of apparatuses may be used to implement the functional blocks. The functional blocks may be implemented by combining software with the one apparatus or the plurality of apparatuses described above.

The functions include, but not limited to, judging, deciding, determining, computing, calculating, processing, deriving, investigating, searching, confirming, receiving, transmitting, outputting, accessing, solving, selecting, choosing, establishing, comparing, supposing, expecting, regarding, broadcasting, notifying, communicating, forwarding, configuring, reconfiguring, allocating, mapping, assigning, and the like. For example, a functional block (component section) that functions to achieve transmission is referred to as "transmission section," "transmitting unit," or "transmitter." The methods for implementing the functions are not limited specifically as described above.

Figure 6:
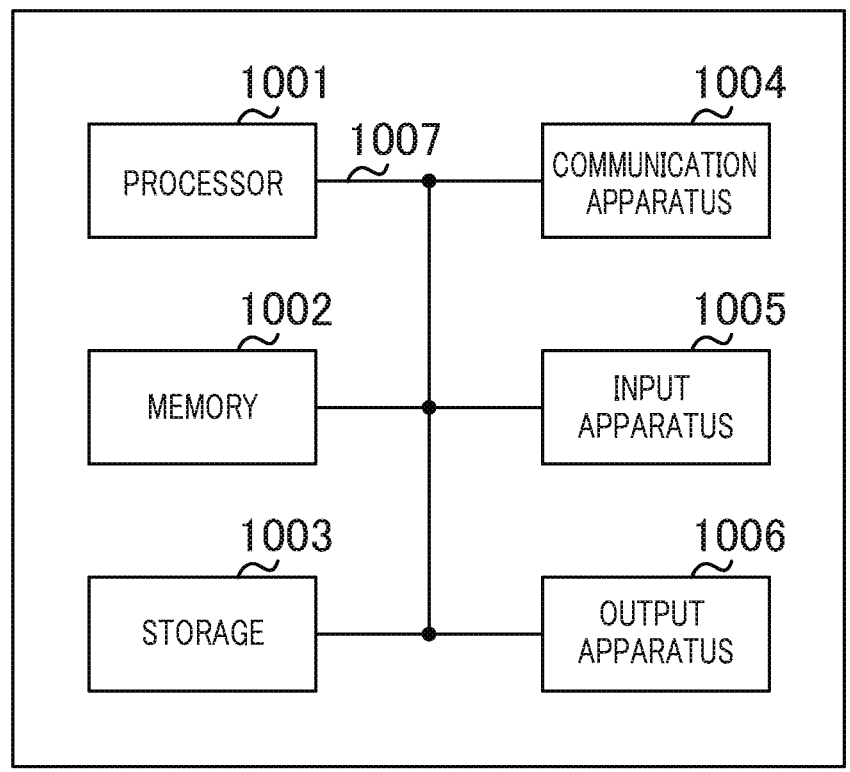
FIG. 6 illustrates an exemplary hardware configuration of the base station and the terminal.

For example, the base station, user equipment, and the like according to an embodiment of the present disclosure may function as a computer that executes processing of a wireless communication method of the present disclosure. FIG. 6 illustrates an exemplary hardware configuration of base station 10 and terminal 20 according to one embodiment of the present disclosure. Physically, base station 10 and terminal 20 as described above may be a computer apparatus including processor 1001, memory 1002, storage 1003, communication apparatus 1004, input apparatus 1005, output apparatus 1006, bus 1007, and the like.

Note that the term "apparatus" in the following description can be replaced with a circuit, a device, a unit, or the like. The hardware configurations of base station 10 and of terminal 20 may include one apparatus or a plurality of apparatuses illustrated in the drawings or may not include part of the apparatuses.

The functions of base station 10 and terminal 20 are implemented by predetermined software (program) loaded into hardware, such as processor 1001, memory 1002, and the like, according to which processor 1001 performs the arithmetic and controls communication performed by communication apparatus 1004 or at least one of reading and writing of data in memory 1002 and storage 1003.

Processor 1001 operates an operating system to entirely control the computer, for example. Processor 1001 may be composed of a central processing unit (CPU) including an interface with peripheral apparatuses, control apparatus, arithmetic apparatus, register, and the like. For example, control sections 101 and 201 and the like as described above may be implemented using processor 1001.

Processor 1001 reads a program (program code), a software module, data, and the like from at least one of storage 1003 and communication apparatus 1004 to memory 1002 and performs various types of processing according to the program (program code), the software module, the data, and the like. As the program, a program for causing the computer to perform at least a part of the operation described in the above embodiments is used. For example, control sections 101 and 201 of base station 10 terminal 20 may be implemented using a control program stored in memory 1002 and operated by processor 1001, and the other functional blocks may also be implemented in the same way. While it has been described that the various types of processing as described above are performed by one processor 1001, the various types of processing may be performed by two or more processors 1001 at the same time or in succession. Processor 1001 may be implemented using one or more chips. Note that the program may be transmitted from a network through a telecommunication line.

Memory 1002 is a computer-readable recording medium and may be composed of, for example, at least one of a Read Only Memory (ROM), an Erasable Programmable ROM (EPROM), an Electrically Erasable Programmable ROM (EEPROM), and a Random Access Memory (RAM). Memory 1002 may be called as a register, a cache, a main memory (main storage apparatus), or the like. Memory 1002 can save a program (program code), a software module, and the like that can be executed to carry out the radio communication method according to an embodiment of the present disclosure.

Storage 1003 is a computer-readable recording medium and may be composed of, for example, at least one of an optical disk such as a Compact Disc ROM (CD-ROM), a hard disk drive, a flexible disk, a magneto-optical disk (for example, a compact disc, a digital versatile disc, or a Blu-ray (registered trademark) disc), a smart card, a flash memory (for example, a card, a stick, or a key drive), a floppy (registered trademark) disk, and a magnetic strip. Storage 1003 may also be called as an auxiliary storage apparatus. The storage medium as described above may be, for example, a database, a server, or other appropriate media including at least one of memory 1002 and storage 1003.

Communication apparatus 1004 is hardware (transmission and reception device) for communication between computers through at least one of wired and wireless networks and is also called as, for example, a network device, a network controller, a network card, or a communication module. Communication apparatus 1004 may be configured to include a high frequency switch, a duplexer, a filter, a frequency synthesizer, and the like in order to achieve at least one of Frequency Division Duplex (FDD) and Time Division Duplex (TDD), for example. For example, transmission sections 102 and 202, reception sections 103 and 203, measurement section 204, and the like as described above may be implemented using communication apparatus 1004.

Input apparatus 1005 is an input device (for example, a keyboard, a mouse, a microphone, a switch, a button, or a sensor) that receives input from the outside. Output apparatus 1006 is an output device (for example, a display, a speaker, or an LED lamp) which makes outputs to the outside. Note that input apparatus 1005 and output apparatus 1006 may be integrated (for example, a touch panel).

The apparatuses, such as processor 1001, memory 1002, and the like are connected by bus 1007 for communication of information. Bus 1007 may be configured using a single bus or using buses different between each pair of the apparatuses.

Furthermore, base station 10 and terminal 20 may include hardware, such as a microprocessor, a digital signal processor (DSP), an Application Specific Integrated Circuit (ASIC), a Programmable Logic Device (PLD), and a Field Programmable Gate Array (FPGA), and the hardware may implement part or all of the functional blocks. For example, processor 1001 may be implemented using at least one of these pieces of hardware.

(Notification of Information and Signaling)

The notification of information is not limited to the aspects or embodiments described in the present disclosure, and the information may be notified by another method. For example, the notification of information may be carried out by one or a combination of physical layer signaling (for example, Downlink Control Information (DCI) and Uplink Control Information (UCI)), upper layer signaling (for example, Radio Resource Control (RRC) signaling, Medium Access Control (MAC) signaling, notification information (Master Information Block (MIB), and System Information Block (SIB))), and other signals. The RRC signaling may be called an RRC message and may be, for example, an RRC connection setup message, an RRC connection reconfiguration message, or the like.

(Adaptive System)

The aspects and embodiments described in the present specification may be applied to at least one of a system using Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (registered trademark), GSM (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), or other appropriate systems and a next-generation system extended based on the above systems. Additionally or alternatively, a combination of two or more of the systems (e.g., a combination of at least LTE or LTE-A and 5G) may be applied.

(Processing Procedure and the Like)

The orders of the processing procedures, the sequences, the flow charts, and the like of the aspects and embodiments described in the present disclosure may be changed as long as there is no contradiction. For example, elements of various steps are presented in exemplary orders in the methods described in the present disclosure, and the methods are not limited to the presented specific orders.

(Operation of Base Station)

Specific operations which are described in the present disclosure as being performed by the base station may sometimes be performed by an upper node depending on the situation. Various operations performed for communication with a user equipment in a network constituted by one network node or a plurality of network nodes including a base station can be obviously performed by at least one of the base station and a network node other than the base station (examples include, but not limited to, Mobility Management Entity (MME) or Serving Gateway (S-GW)). Although there is one network node in addition to the base station in the case illustrated above, a plurality of other network nodes may be combined (for example, MME and S-GW).

(Direction of Input and Output)

The information, the signals, and the like can be output from a higher layer (or a lower layer) to a lower layer (or a higher layer). The information, the signals, and the like may be input and output through a plurality of network nodes.

(Handling of Input and Output Information and the Like)

The input and output information and the like may be saved in a specific place (for example, memory) or may be managed using a management table. The input and output information and the like can be overwritten, updated, or additionally written. The output information and the like may be deleted. The input information and the like may be transmitted to another apparatus.

(Determination Method)

The determination may be made based on a value expressed by one bit (0 or 1), based on a Boolean value (true or false), or based on comparison with a numerical value (for example, comparison with a predetermined value).

(Software)

Regardless of whether the software is called as software, firmware, middleware, a microcode, or a hardware description language or by another name, the software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and the like.

The software, the instruction, the information, and the like may be transmitted and received through a transmission medium. For example, when the software is transmitted from a website, a server, or another remote source by using at least one of a wired technique (e.g., a coaxial cable, an optical fiber cable, a twisted pair, and a digital subscriber line (DSL)) and a wireless technique (e.g., an infrared ray and a microwave), the at least one of the wired technique and the wireless technique is included in the definition of the transmission medium.

(Information and Signals)

The information, the signals, and the like described in the present disclosure may be expressed by using any of various different techniques. For example, data, instructions, commands, information, signals, bits, symbols, chips, and the like that may be mentioned throughout the entire description may be expressed by one or an arbitrary combination of voltage, current, electromagnetic waves, magnetic fields, magnetic particles, optical fields, and photons.

Note that the terms described in the present disclosure and the terms necessary to understand the present disclosure may be replaced with terms with the same or similar meaning. For example, at least one of the channel and the symbol may be a signal (signaling). The signal may be a message. The component carrier (CC) may be called a carrier frequency, a cell, a frequency carrier, or the like.

("System" and "Network")

The terms "system" and "network" used in the present disclosure can be interchangeably used.

(Names of Parameters and Channels)

The information, the parameters, and the like described in the present disclosure may be expressed using absolute values, using values relative to predetermined values, or using other corresponding information. For example, radio resources may be indicated by indices.

The names used for the parameters are not limitative in any respect. Furthermore, the numerical formulas and the like using the parameters may be different from the ones explicitly disclosed in the present disclosure. Various channels (for example, PUCCH and PDCCH) and information elements can be identified by any suitable names, and various names assigned to these various channels and information elements are not limitative in any respect.

(Base Station)

The terms "Base Station (BS)," "wireless base station," "fixed station," "NodeB," "eNodeB (eNB)," "gNodeB (gNB)," "access point," "transmission point," "reception point," "transmission/reception point," "cell," "sector," "cell group," "carrier," and "component carrier" may be used interchangeably in the present disclosure. The base station may be called a macro cell, a small cell, a femtocell, or a pico cell.

The base station can accommodate one cell or a plurality of (for example, three) cells. When the base station accommodates a plurality of cells, the entire coverage area of the base station can be divided into a plurality of smaller areas, and each of the smaller areas can provide a communication service based on a base station subsystem (for example, small base station for indoor remote radio head (RRH)). The term "cell" or "sector" denotes part or all of the coverage area of at least one of the base station and the base station subsystem that perform the communication service in the coverage.

(Terminal)

The terms "Mobile Station (MS)," "user terminal," "User Equipment (UE)," and "terminal" may be used interchangeably in the present disclosure.

The mobile station may be called, by those skilled in the art, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or by some other appropriate terms.

(Base Station/Mobile Station)

At least one of the base station and the mobile station may be called a transmission apparatus, a reception apparatus, a communication apparatus, or the like. Note that, at least one of the base station and the mobile station may be a device mounted in a mobile entity, the mobile entity itself, or the like. The mobile entity may be a vehicle (e.g., an automobile or an airplane), an unmanned mobile entity (e.g., a drone or an autonomous vehicle), or a robot (a manned-type or unmanned-type robot). Note that, at least one of the base station and the mobile station also includes an apparatus that does not necessarily move during communication operation. For example, at least one of the base station and the mobile station may be Internet-of-Things (IoT) equipment such as a sensor.

The base station in the present disclosure may also be replaced with the user equipment. For example, the aspects and the embodiments of the present disclosure may find application in a configuration that results from replacing communication between the base station and the user equipment with communication between multiple user equipments (such communication may, e.g., be referred to as device-to-device (D2D), vehicle-to-everything (V2X), or the like). In this case, user equipment 20 may be configured to have the functions that base station 10 described above has. The wordings "uplink" and "downlink" may be replaced with a corresponding wording for inter-equipment communication (for example, "side"). For example, an uplink channel, a downlink channel, and the like may be replaced with a side channel.

Similarly, the user equipment in the present disclosure may be replaced with the base station. In this case, base station 10 is configured to have the functions that user equipment 20 described above has.

(Meaning and Interpretation of Terms)

As used herein, the term "determining" may encompass a wide variety of actions. For example, "determining" may be regarded as judging, calculating, computing, processing, deriving, investigating, looking up, searching (or, search or inquiry)(e.g., looking up in a table, a database or another data structure), ascertaining and the like. Furthermore, "determining" may be regarded as receiving (for example, receiving information), transmitting (for example, transmitting information), inputting, outputting, accessing (for example, accessing data in a memory) and the like. Also, "determining" may be regarded as resolving, selecting, choosing, establishing, comparing and the like. That is, "determining" may be regarded as a certain type of action related to determining. Also, "determining" may be replaced with "assuming," "expecting," "considering," and the like.

The terms "connected" and "coupled" as well as any modifications of the terms mean any direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. For example, "connected" may be replaced with "accessed." When the terms are used in the present disclosure, two elements can be considered to be "connected" or "coupled" to each other using at least one of one or more electrical wires, cables, and printed electrical connections or using electromagnetic energy with a wavelength of a radio frequency domain, a microwave domain, an optical (both visible and invisible) domain, or the like that are non-limiting and non-inclusive examples.

The reference signal can also be abbreviated as an RS and may also be called as a pilot depending on the applied standard.

The description "based on" used in the present disclosure does not mean "based only on," unless otherwise specified. In other words, the description "based on" means both of "based only on" and "based at least on."

Any reference to elements by using the terms "first," "second," and the like that are used in the present disclosure does not generally limit the quantities of or the order of these elements. The terms can be used as a convenient method of distinguishing between two or more elements in the present disclosure. Therefore, reference to first and second elements does not mean that only two elements can be employed, or that the first element has to precede the second element somehow.

The "section" in the configuration of each apparatus may be replaced with "means," "circuit," "device," or the like.

In a case where terms "include," "including," and their modifications are used in the present disclosure, these terms are intended to be inclusive like the term "comprising." Further, the term "or" used in the present disclosure is not intended to be an exclusive or.

The radio frame may be constituted by one frame or a plurality of frames in the time domain. The one frame or each of the plurality of frames may be called a subframe in the time domain. The subframe may be further constituted by one slot or a plurality of slots in the time domain. The subframe may have a fixed time length (e.g., 1 ms) independent of numerology.

The numerology may be a communication parameter that is applied to at least one of transmission and reception of a certain signal or channel. The numerology, for example, indicates at least one of SubCarrier Spacing (SCS), a bandwidth, a symbol length, a cyclic prefix length, Transmission Time Interval (TTI), the number of symbols per TTI, a radio frame configuration, specific filtering processing that is performed by a transmission and reception apparatus in the frequency domain, specific windowing processing that is performed by the transmission and reception apparatus in the time domain, and the like.

The slot may be constituted by one symbol or a plurality of symbols (e.g., Orthogonal Frequency Division Multiplexing (OFDM)) symbol, Single Carrier-Frequency Division Multiple Access (SC-FDMA) symbol, or the like) in the time domain. The slot may also be a time unit based on the numerology.

The slot may include a plurality of mini-slots. Each of the mini-slots may be constituted by one or more symbols in the time domain. Furthermore, the mini-slot may be referred to as a subslot. The mini-slot may be constituted by a smaller number of symbols than the slot. A PDSCH (or a PUSCH) that is transmitted in the time unit that is greater than the mini-slot may be referred to as a PDSCH (or a PUSCH) mapping type A. The PDSCH (or the PUSCH) that is transmitted using the mini-slot may be referred to as a PDSCH (or PUSCH) mapping type B.

The radio frame, the subframe, the slot, the mini slot, and the symbol indicate time units in transmitting signals. The radio frame, the subframe, the slot, the mini slot, and the symbol may be called by other corresponding names. For example, one subframe, a plurality of continuous subframes, one slot, or one mini-slot may be called a Transmission Time Interval (TTI). That is, at least one of the subframe and the TTI may be a subframe (1 ms) in the existing LTE, a duration (for example, 1 to 13 symbols) that is shorter than 1 ms, or a duration that is longer than 1 ms. Note that, a unit that represents the TTI may be referred to as a slot, a mini-slot, or the like instead of a subframe.

Here, the TTI, for example, refers to a minimum time unit for scheduling in wireless communication. For example, in an LTE system, the base station performs scheduling for allocating a radio resource (a frequency bandwidth, a transmit power, and the like that are used in each user equipment) on the basis of TTI to each user equipment. Note that, the definition of TTI is not limited to this.

The TTI may be a time unit for transmitting a channel-coded data packet (a transport block), a code block, or a codeword, or may be a unit for processing such as scheduling and link adaptation. Note that, when the TTI is assigned, a time section (for example, the number of symbols) to which the transport block, the code block, the codeword, or the like is actually mapped may be shorter than the TTI.

Note that, in a case where one slot or one mini-slot is referred to as the TTI, one or more TTIs (that is, one or more slots, or one or more mini-slots) may be a minimum time unit for the scheduling. Furthermore, the number of slots (the number of mini-slots) that make up the minimum time unit for the scheduling may be controlled.

A TTI that has a time length of 1 ms may be referred to as a usual TTI (a TTI in LTE Rel. 8 to LTE Rel. 12), a normal TTI, a long TTI, a usual subframe, a normal subframe, a long subframe, a slot, or the like. A TTI that is shorter than the usual TTI may be referred to as a shortened TTI, a short TTI, a partial TTI (or a fractional TTI), a shortened subframe, a short subframe, a mini-slot, a subslot, a slot, or the like.

Note that the long TTI (for example, the usual TTI, the usual subframe, or the like) may be replaced with the TTI that has a time length which exceeds 1 ms, and the short TTI (for example, the shortened TTI or the like) may be replaced with a TTI that has a TTI length which is less than a TTI length of the long TTI and is equal to or longer than 1 ms.

A resource block (RB) is a resource allocation unit in the time domain and the frequency domain, and may include one or more contiguous subcarriers in the frequency domain. The number of subcarriers that are included in the RB may be identical regardless of the numerology, and may be 12, for example. The number of subcarriers that are included in the RB may be determined based on the numerology.

In addition, the RB may include one symbol or a plurality of symbols in the time domain, and may have a length of one slot, one mini slot, one subframe, or one TTI. One TTI and one subframe may be constituted by one resource block or a plurality of resource blocks.

Note that one or more RBs may be referred to as a Physical Resource Block (PRB), a Sub-Carrier Group (SCG), a Resource Element Group (REG), a PRB pair, an RB pair, or the like.

In addition, the resource block may be constituted by one or more Resource Elements (REs). For example, one RE may be a radio resource region that is one subcarrier and one symbol.

A bandwidth part (BWP) (which may be referred to as a partial bandwidth or the like) may represent a subset of contiguous common resource blocks (RB) for certain numerology in a certain carrier. Here, the common RBs may be identified by RB indices that use a common reference point of the carrier as a reference. The PRB may be defined by a certain BWP and may be numbered within the BWP.

The BWP may include a UL BWP and a DL BWP. An UE may be configured with one or more BWPs within one carrier.

At least one of the configured BWPs may be active, and the UE does not have to assume transmission/reception of a predetermined signal or channel outside the active BWP. Note that, "cell," "carrier," and the like in the present disclosure may be replaced with "BWP."

Structures of the radio frame, the subframe, the slot, the mini-slot, the symbol, and the like are described merely as examples. For example, the configuration such as the number of subframes that are included in the radio frame, the number of slots per subframe or radio frame, the number of mini-slots that are included within the slot, the numbers of symbols and RBs that are included in the slot or the mini-slot, the number of subcarriers that are included in the RB, the number of symbols within the TTI, the symbol length, the Cyclic Prefix (CP) length, and the like can be changed in various ways.

In a case where articles, such as "a," "an," and "the" in English, for example, are added in the present disclosure by translation, nouns following these articles may have the same meaning as used in the plural.

(Variations and the Like of Aspects)

The aspects and embodiments described in the present disclosure may be independently used, may be used in combination, or may be switched and used along the execution. Furthermore, notification of predetermined information (for example, notification indicating "it is X") is not limited to explicit notification, and may be performed implicitly (for example, by not notifying the predetermined information).

While the present disclosure has been described in detail, it is obvious to those skilled in the art that the present disclosure is not limited to the embodiments described in the present disclosure. Modifications and variations of the aspects of the present disclosure can be made without departing from the spirit and the scope of the present disclosure defined by the description of the appended claims. Therefore, the description of the present disclosure is intended for exemplary description and does not limit the present disclosure in any sense.

INDUSTRIAL APPLICABILITY

One aspect of the present disclosure is useful for wireless communication systems.

REFERENCE SIGNS LIST

10 Base station
20 Terminal
101, 201 Control section
102, 202 Transmission section
103, 203 Reception section
204 Measurement section

The invention claimed is:

1. A terminal comprising:
a control section that generates Capability information including a Power Class of a terminal; and
a transmission section that transmits the Capability information,
wherein a spherical coverage EIS is specified for each of a plurality of the Power Classes,
wherein, in at least one of the plurality of Power Classes, a specified value of the spherical coverage EIS is determined by a method different between Inter-band Carrier Aggregation (CA) using a plurality of bands and a case other than the Inter-band CA, and
wherein the specified value of the spherical coverage EIS for a first band and the specified value of the spherical coverage EIS for a second band in the Inter-band CA are determined independently of each other in a same beam direction in two of the first and the second bands.

2. The terminal according to claim 1, wherein a Peak Effective Isotropic Sensitivity (EIS) is specified for each of a plurality of the Power Classes, and,
in at least one of the plurality of Power Classes, a specified value of the Peak EIS is determined by a method different between the Inter-band CA and a case other than the Inter-band CA,
wherein the specified value of the Peak EIS for the first band and the specified value of the Peak EIS for the second band in the Inter-band CA are determined independently of each other.

3. A system, comprising:
a terminal that generates Capability information including a Power Class of the terminal, and transmits the Capability information; and
a base station that receives the Capability information,
wherein a spherical coverage Effective Isotropic Sensitivity (EIS) is specified for each of a plurality of the Power Classes,
wherein, in at least one of the plurality of Power Classes, a specified value of the spherical coverage EIS is determined by a method different between Inter-band Carrier Aggregation (CA) using a plurality of bands and a case other than the Inter-band CA, and
wherein the specified value of the spherical coverage EIS for a first band and the specified value of the spherical coverage EIS for a second band in the Inter-band CA are determined independently of each other in a same beam direction in two of the first and the second bands.

4. A communication method performed by a terminal, comprising:
- generating Capability information including a Power Class; and
- transmitting the Capability information,
- wherein a spherical coverage Effective Isotropic Sensitivity (EIS) is specified for each of a plurality of the Power Classes,
- wherein, in at least one of the plurality of Power Classes, a specified value of the spherical coverage EIS is determined by a method different between Inter-band Carrier Aggregation (CA) using a plurality of bands and a case other than the Inter-band CA, and
- wherein the specified value of the spherical coverage EIS for a first band and the specified value of the spherical coverage EIS for a second band in the Inter-band CA are determined independently of each other in a same beam direction in two of the first and the second bands.

* * * * *